United States Patent
Feng

(10) Patent No.: US 10,891,002 B2
(45) Date of Patent: Jan. 12, 2021

(54) CONTROL METHOD AND TOUCH DISPLAY SYSTEM

(71) Applicant: Chipone Technology (Beijing) Co., Ltd., Beijing (CN)

(72) Inventor: Pengfei Feng, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/628,003

(22) PCT Filed: Oct. 17, 2018

(86) PCT No.: PCT/CN2018/110573
§ 371 (c)(1),
(2) Date: Dec. 31, 2019

(87) PCT Pub. No.: WO2019/205510
PCT Pub. Date: Oct. 31, 2019

(65) Prior Publication Data
US 2020/0218420 A1   Jul. 9, 2020

(30) Foreign Application Priority Data
Apr. 26, 2018 (CN) .......................... 2018 1 0386957

(51) Int. Cl.
G06F 3/041 (2006.01)
G06F 3/044 (2006.01)

(52) U.S. Cl.
CPC .......... G06F 3/04166 (2019.05); G06F 3/044 (2013.01); G06F 3/0412 (2013.01)

(58) Field of Classification Search
CPC ... G06F 3/0412; G06F 3/0416; G06F 3/04166
(Continued)

(56) References Cited

U.S. PATENT DOCUMENTS 9,851,839 B2 * 12/2017 Miyake ................. G06F 3/0416
9,927,894 B2 *  3/2018 Abe ..................... G06F 3/04166
(Continued)

FOREIGN PATENT DOCUMENTS

| CN | 105278729 | 1/2016 |
| CN | 105739757 | 7/2016 |

(Continued)

*Primary Examiner* — Calvin C Ma
(74) *Attorney, Agent, or Firm* — Treasure IP Group, LLC

(57) ABSTRACT

The present disclosure discloses a control method and a touch display apparatus. The control method includes: dividing one frame into multiple sub-frames, wherein each sub-frame includes a display time period and a touch control time period; performing display scanning on a touch display apparatus in the display time period to display a picture; performing touch scanning on the touch display apparatus in the touch control time period to obtain a touch sensing signal; and obtaining touch sensing data according to the touch sensing signal and detecting touch according to the touch sensing data, wherein performing touch control scanning on the touch display apparatus includes: if no touch is detected in a preset time period, entering a first mode in which the multiple touch sensing channels are short-circuited and one of the multiple touch sensing channels is scanned in the touch control time period of one of the multiple sub-frames.

11 Claims, 6 Drawing Sheets

(58) Field of Classification Search
USPC .................................................. 345/173, 174
See application file for complete search history.

(56) References Cited

U.S. PATENT DOCUMENTS

| | | | | |
|---|---|---|---|---|
| 10,664,076 B2* | 5/2020 | Ahn | ........................ | G06F 3/041 |
| 10,706,790 B2* | 7/2020 | Niikura | .................. | C09K 19/02 |
| 2017/0315652 A1* | 11/2017 | Pourbigharaz | ............ | G06F 1/08 |

FOREIGN PATENT DOCUMENTS

| | | | |
|---|---|---|---|
| CN | 106468982 | A | 3/2017 |
| CN | 107015693 | A | 8/2017 |
| CN | 107272965 | | 10/2017 |
| CN | 107390934 | | 11/2017 |
| CN | 108664163 | | 10/2018 |
| CN | 106502451 | B | 7/2019 |

* cited by examiner

CONTROL METHOD AND TOUCH DISPLAY SYSTEM

CROSS-REFERENCE TO RELATED APPLICATION

The present application claims priority to the Chinese Patent Application No. 201810386957.2, filed on Apr. 26, 2018, and entitled "CONTROL METHOD AND TOUCH DISPLAY SYSTEM", which is incorporated herein by reference to entire specification, claims, drawings and abstract of the above Chinese patent application.

BACKGROUND OF THE DISCLOSURE

Field of the Disclosure

The present disclosure relates to the technical field of touch display, and in particular to a control method and a touch display system.

Description of the Related Art

A capacitance-type touch display apparatus includes a touch electrode integrated into a display screen and a driving circuit thereof. The touch electrode consists of single or multiple patterning metal layers, and may cover a display panel or build in the display panel, for example, the touch electrode is located in an array substrate of the display panel.

The touch display apparatus has a display driving function and a touch driving function. In order to display an image, a display driving module respectively gates thin film transistors of pixel units in a corresponding row through multiple gate lines in a frame cycle of the image. In order to implement touch detection, a touch control driving module detects a change of a capacitance value through multiple sensing lines (that are RX lines) in the frame cycle of touch so as to obtain position information.

The touch display apparatus uses a manner of performing touch control scanning and display scanning in time division to implement the display driving function and the touch driving function. In other words, when the display scanning is performed, the touch control detection scanning is suspended; and when the touch control detection scanning is performed, the display scanning is suspended. In a time-division control method, an image frame is divided into multiple display time periods in each of which the display scanning for a predetermined number of gate lines is performed; and a touch frame for is divided into multiple touch time periods in each of which the touch control scanning for a predetermined number of drive lines (that are TX lines) is performed. The touch control time periods are inserted among display time periods, so that the detection on one or more touch frames may be implemented in one image frame.

In various touch types, a touch driving mode may be separated into a touch idle mode for determining whether there is a touch input and a touch activation mode for detecting the touch input position, that is, the panel is driven in the touch idle mode to determine whether the panel is touched, and in case of the touch input when the panel is operated in the touch idle mode, the panel is driven in the touch activation mode to detect the touch input position.

FIG. 1 is a schematic diagram illustrating that a touch control scanning signal is applied when an existing touch display apparatus is operated in the touch idle mode and the touch activation mode. As shown in FIG. 1, in the existing touch display apparatus, the touch control scanning signal is applied continuously through a Touch Driver Integrated Circuit (TDIC) in the touch idle mode and the touch activation mode. Within one frame cycle, the touch control scanning signal is applied to all electrodes for two times in total in the touch activation mode. However, in the touch idle mode, the touch control scanning signal is only applied to a part of electrodes, and the report rate is reduced by increasing a scanning interval.

The shortages of the touch display apparatus in the prior art lie in: if the report rate is not enough low, the power consumption cannot be saved effectively; but if the report rate is too low, when a finger clicks too fast, the TDIC cannot detect the touch of the finger and cannot be switched to the touch activation mode, so that the user experience is reduced.

SUMMARY OF THE DISCLOSURE

In view of this, an objective of the present disclosure is to provide a control method and a touch display system, which can reduce the power consumption of a touch display apparatus in a touch idle mode, and may further be quickly switched back to a touch activation mode without affecting the user experience.

According to one aspect of the present disclosure, there is provided a control method for a touch display apparatus, the touch display apparatus comprising multiple touch sensing channels, and the control method comprising: dividing one frame into multiple sub-frames, wherein each sub-frame comprises a display time period and a touch control time period; performing display scanning on the touch display apparatus in the display time period to display a picture; performing touch control scanning on the touch display apparatus in the touch control time period to obtain a touch sensing signal; and obtaining touch sensing data according to the touch sensing signal and detecting touch according to the touch sensing data, wherein performing touch control scanning on the touch display apparatus comprises:

if no touch is detected in a preset time period, entering a first mode in which the multiple touch sensing channels are short-circuited and one of the multiple touch sensing channels is scanned in the touch control time period of one of the multiple sub-frames;

and if touch is detected in the preset time period, entering a second mode in which the multiple touch sensing channels are respectively scanned in the touch control time periods of the multiple sub-frames.

Preferably, the control method further includes: if touch is detected in the first mode, switching to the second mode.

Preferably, detecting touch according to the touch sensing data comprises:

calculating a difference between the touch sensing data and reference data; and comparing the difference with a preset value, and when the difference is greater than the preset value, determining that the touch occurs, wherein the reference data used in the first mode is a first-frame touch sensing data obtained after the first mode is entered.

Preferably, that one of the multiple touch sensing channels is scanned in the touch control time period of one of the multiple sub-frames comprises:

scanning one of the multiple touch sensing channels in the touch control time period of a second sub-frame of the frame.

Preferably, the frequency for the touch control scanning in the first mode is smaller than that for the touch control scanning in the second mode.

Preferably, the frequency for the touch control scanning in the first mode is 1/N of the frequency for the touch control scanning in the second mode, and N is an integer greater than 1.

According to another aspect of the present disclosure, there is provided a touch display system, including a touch display apparatus and a control apparatus, wherein the touch display apparatus includes multiple touch sensing channels, and the control apparatus is configured to perform the above-mentioned control method.

Preferably, the control apparatus includes: a display control module, configured to perform display scanning on the touch display apparatus in a display time period to display a picture; and a touch control module, configured to perform touch control scanning on the touch display apparatus in a touch control time period to obtain a touch sensing signal, obtain touch sensing data according to the touch sensing signal and detect touch according to the touch sensing data.

Preferably, the control apparatus further comprises a switch module being coupled between the touch control module and the multiple touch sensing channels and configured to short-circuit the multiple touch sensing channels and then couple the multiple touch sensing channels to the touch control module, or independently couple the multiple touch sensing channels to the touch control module, under the control of the touch control module.

Preferably, the touch display system is a Touch and Display Driver Integration (TDDI) system.

According to the control method and the touch display system provided by the present disclosure, by short-circuiting multiple touch sensing channels in the touch idle mode and scanning one of the multiple touch sensing channels in a touch control time period of one of multiple sub-frames, the scanning time is greatly reduced and the power consumption of the touch display apparatus in the touch idle mode may be reduced.

In a preferred embodiment, the frequency for touch control scanning of the touch display apparatus in the touch idle mode is smaller than that for the touch control scanning of the touch display apparatus in the touch activation mode, so that the power consumption may further be reduced.

In other embodiments of the present disclosure, the first-frame touch sensing data after the touch idle mode is used as reference data, and the difference between the touch sensing data of each frame and the reference data is calculated, and when the difference is greater than a preset value, it is determined that touch occurs and the touch activation mode may be quickly switched back to, and therefore, the user experience is not affected.

BRIEF DESCRIPTION OF THE DRAWINGS

The above and other objects, features and advantages of the present disclosure will become more apparent from the description below with reference to the accompanying drawings.

DETAILED DESCRIPTION OF THE DISCLOSURE

Figure 1:
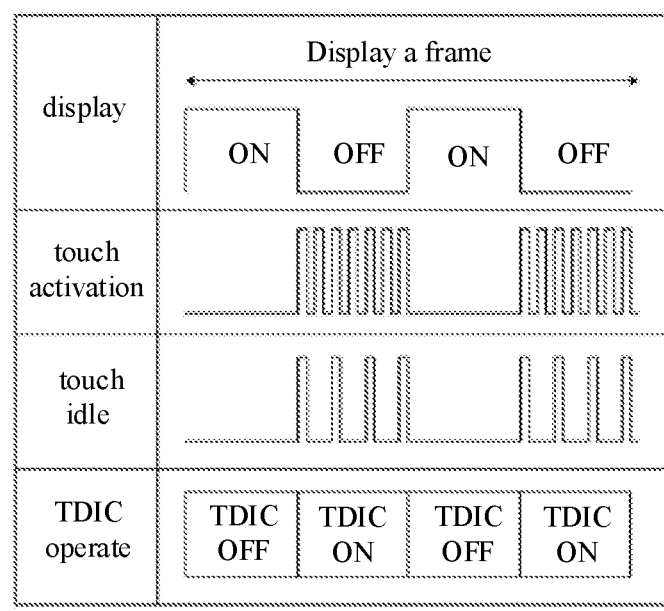
FIG. 1 is a schematic diagram illustrating that a touch control scanning signal is applied when an existing touch display apparatus is operated in the touch idle mode and the touch activation mode.

The present disclosure will be described in more detail below with reference to the accompanying drawings. In the various figures, the same elements are denoted by the similar reference numerals. For the sake of clarity, the various parts in the figures are not drawn to scale. In addition, some well-known parts may not be shown in the figures.

The following describes many particular details of the present disclosure, such as a structure, material, dimension, treatment process and technology of a device, for the easy of a clear understanding of the present disclosure. However, as being understood by a person skilled in the art, the present disclosure may not be implemented according to these particular details.

In the present disclosure, the term "sub-frame" indicates a uniform time unit in a control process of a touch display apparatus. For a display portion, the "sub-frame" indicates a time period to display an image integrally on a display screen, and the "display time period" indicates the time period to display a part of image on the display screen during each sub-frame. Correspondingly, for a touch portion, the "sub-frame" indicates the time period in which the detection on all sensing points is completed for at least one time on a whole effective surface of a touch sensor to obtain a corresponding capacitance value, and the "touch control time period" indicates the time period in which the capacitance value for a part of sensing points is obtained during each sub-frame. In a touch display apparatus, one "sub-frame" may be divided into multiple "touch control time periods" and multiple "display time periods".

The present disclosure can be embodied in various forms, some of which are described below.

Figure 2:
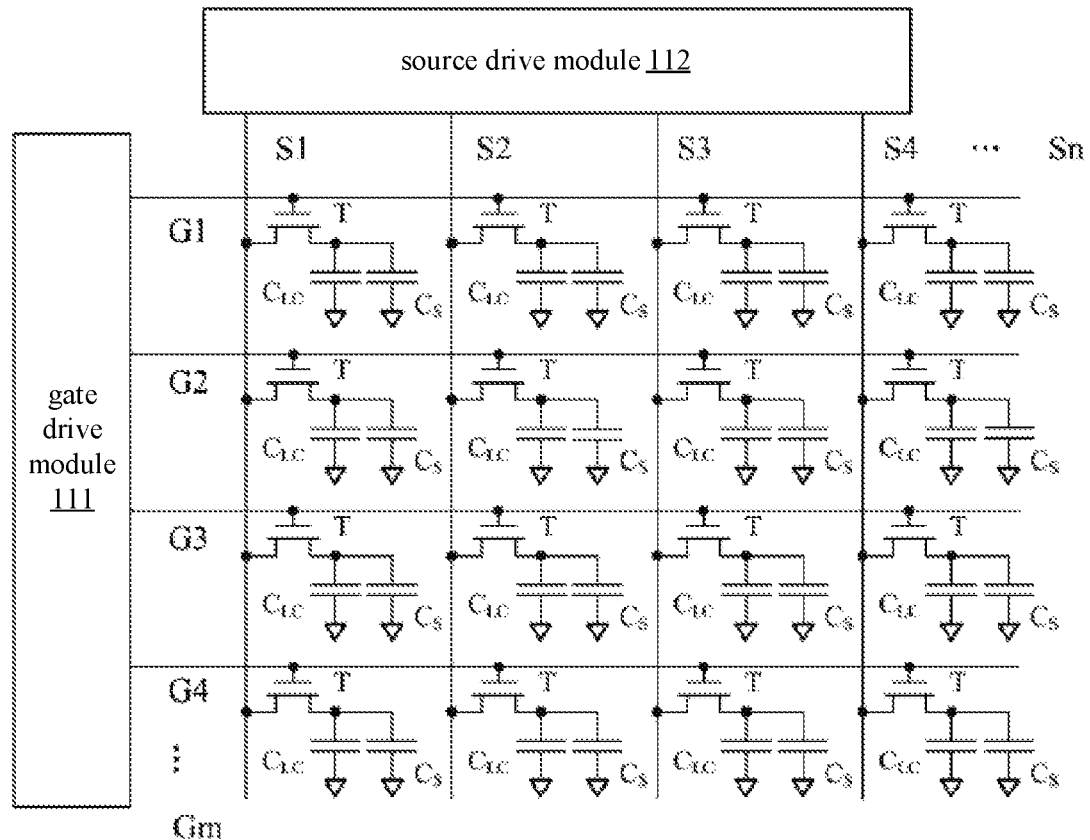
FIG. 2 illustrates an equivalent circuit diagram of a liquid crystal display apparatus in a touch display apparatus according to a first embodiment of the present disclosure.

FIG. 2 illustrates an equivalent circuit diagram of a liquid crystal display apparatus in a touch display apparatus according to an embodiment of the present disclosure.

The liquid crystal display apparatus 110 includes a gate drive module 111, a source drive module 112, multiple thin film transistors T, and multiple pixel capacitors $C_{LC}$ formed between pixel electrodes and a common electrode. The multiple thin film transistors T are formed into an array. The gate drive module 111 is respectively coupled to gates of the thin film transistors T in a corresponding row through multiple gate scanning lines, and configured to provide gate voltages G1-Gm in a scanning manner to gate the thin film transistors in different rows in a sub-frame. The source drive module 112 is respectively coupled to sources of the thin film transistors T in a corresponding column through multiple source data lines, and configured to provide gray-scale voltages S1-Sn corresponding to gray scale to the multiple thin film transistors T in various column when multiple thin film transistors T in various row are gated. Both the m and the n are a natural number. Drains of the multiple thin film transistors T are respectively coupled to the corresponding pixel capacitors $C_{LC}$.

In a gated state, the source drive module 112 applies the gray-scale voltages to the pixel capacitors $C_{LC}$ through source data lines and the thin film transistors T. The voltage on the pixel capacitors $C_{LC}$ is acted on a liquid crystal molecule, thus changing an orientation of the liquid crystal molecule to implement light transmittance corresponding to the gray scale. In order to keep the voltage between refresh cycles of a pixel, each pixel capacitor $C_{LC}$ may be coupled in parallel to a storage capacitor Cs to obtain longer keeping time.

Figure 3:
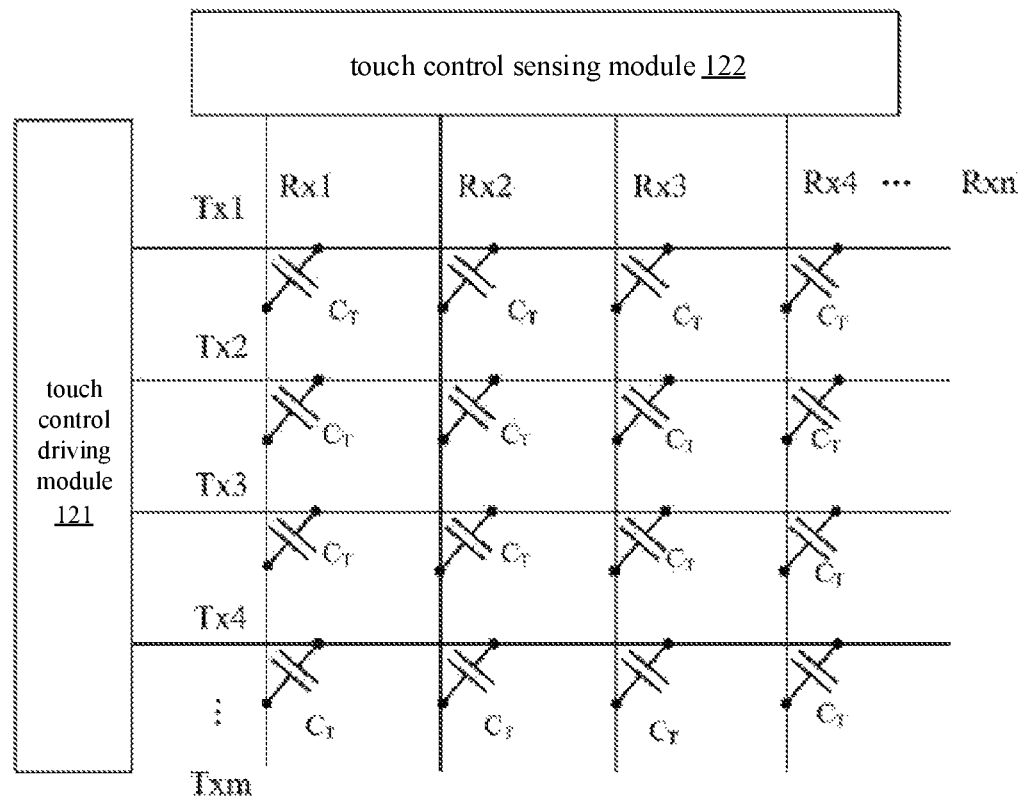
FIG. 3 illustrates an equivalent circuit diagram of a touch apparatus in a touch display apparatus according to a first embodiment of the present disclosure.

FIG. 3 illustrates an equivalent circuit diagram of a touch apparatus in a touch display apparatus according to an embodiment of the present disclosure.

The touch apparatus 120 includes a touch control driving module 121, a touch control sensing module 122, and multiple sensing capacitors $C_T$ formed between an excitation lines and an sensing lines. The multiple sensing capacitors $C_T$ are formed into an array. The touch control driving module 121 is coupled to excitation lines of all rows, and configured to provide excitation signals Tx1-Txm in a scanning manner, thus providing the excitation signal to the excitation lines of different rows in sequence in one frame cycle of touch. The touch control sensing module 122 is coupled to sensing lines of all columns, thereby receiving a receiving signals Rx1-Rxn of the corresponding columns. Both the m and the n are a natural number.

The touch control driving module 121 generates, for example, an alternating-current electrical signal serving as the excitation signal; and the touch control sensing module 122 receives, for example, the alternating-current electrical signal, and detects a current value according to the received signal, thus further obtaining a capacitance value at an intersection between a drive electrode and the sensing line according to the current value and determining whether a touch action occurs at this intersection.

Figure 4:
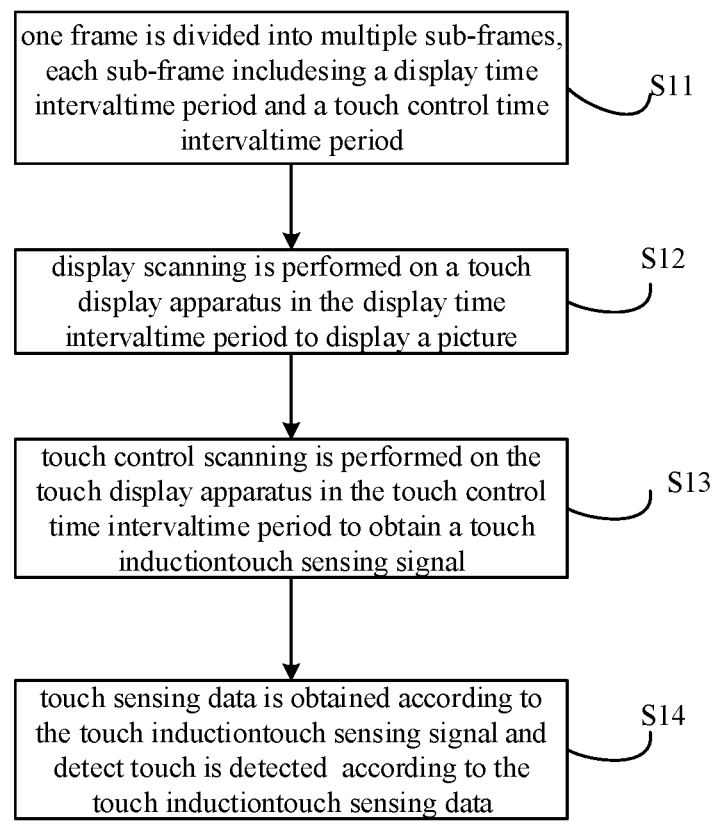
FIG. 4 illustrates a flowchart of a control method according to a second embodiment of the present disclosure.

FIG. 4 illustrates a flowchart of a control method according to a second embodiment of the present disclosure. According to the control method for a touch display apparatus provided by the second embodiment of the present disclosure, the touch display apparatus includes multiple touch sensing channels, such as sensing lines shown in FIG. 3. The control method includes the following steps.

In S11, one frame is divided into multiple sub-frames, each sub-frame includes a display time period and a touch control time period.

In S12, display scanning is performed on a touch display apparatus in the display time period to display a picture.

In S13, touch control scanning is performed on the touch display apparatus in the touch control time period to obtain a touch sensing signal.

In S14, touch sensing data is obtained according to the touch sensing signal and touch is detected according to the touch sensing data.

The step of detecting touch according to the touch sensing data includes the following steps: calculating a difference between the touch sensing data and reference data; and comparing the difference with a preset value, and when the difference is greater than the preset value, determining that the touch occurs.

Figure 5:
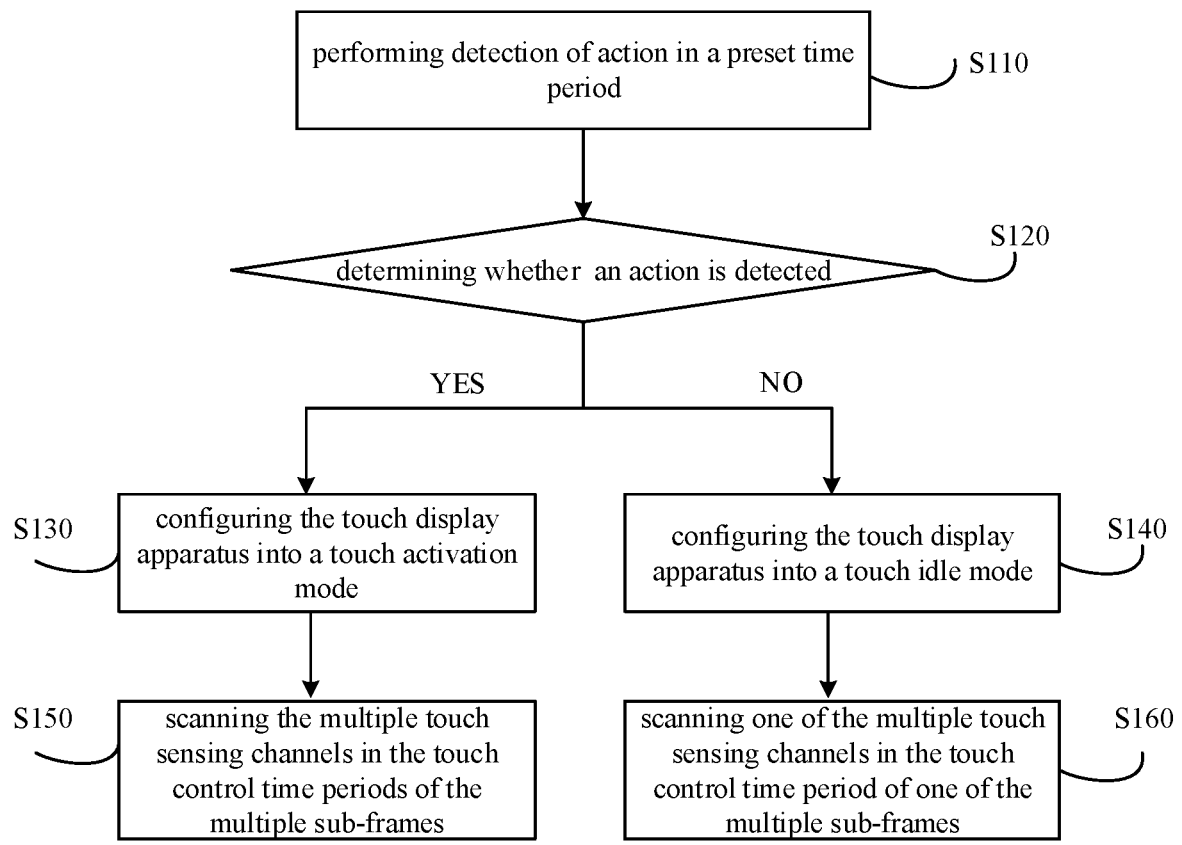
FIG. 5 illustrates a flowchart for performing touch control scanning on a touch display apparatus.

FIG. 5 illustrates a flowchart for performing touch control scanning on a touch display apparatus. As shown in FIG. 5, the step of performing touch control scanning on the touch display apparatus includes the following steps.

In S110, detection of action is performed in a preset time period.

In S120, whether a touch action is detected in the preset time is determined, and when the touch action is detected, the step S130 of configuring the touch display apparatus into a touch activation mode is performed and the step S150 of scanning the multiple touch sensing channels in the touch control time periods of the multiple sub-frames is performed.

When the touch action is not detected, the step S140 of configuring the touch display apparatus into a touch idle mode and short-circuiting multiple touch sensing channels are performed and the step S160 of scanning one of the multiple touch sensing channels in the touch control time period of one of the multiple sub-frames is performed.

In addition, when touch detection is performed according to the touch sensing data in the touch idle mode, a first-frame touch sensing data after the entry of the touch idle mode is used as reference data, and thereafter, touch detection is performed according to the touch sensing data of each frame and the reference data.

Figure 6:
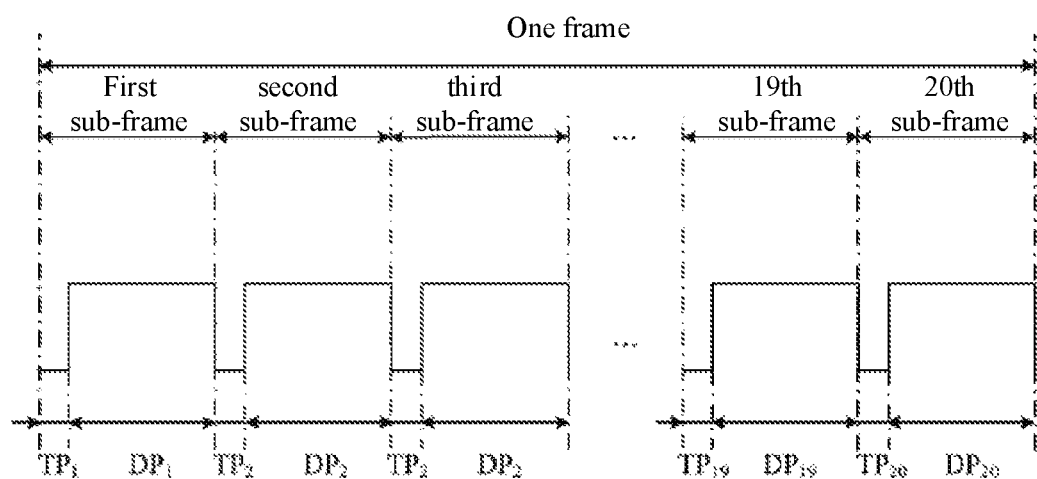
FIG. 6 illustrates a time sequence diagram showing a control method according to a second embodiment of the present disclosure using a time-division manner to perform display driving and touch driving.

FIG. 6 illustrates a time sequence diagram showing a control method according to a second embodiment of the present disclosure using a time-division manner to perform display driving and touch driving.

The control method uses the time-division manner to perform the display driving and the touch driving. When the display scanning is performed, the touch control detection scanning is suspended, and when the touch control detection scanning is performed, the display scanning is suspended. In the time-division control method, one frame is divided into multiple sub-frames. As shown in FIG. 6, one frame is divided into 20 sub-frames. Each sub-frame includes a display time period and a touch control time period. When the touch display apparatus is configured into the touch idle mode, the touch control scanning for a predetermined number of sensing lines is completed in the touch time period of one sub-frame of the multiple sub-frames, for example, the touch control scanning for a predetermined number of sensing lines is completed in the touch control time period $TP_2$ of a second sub-frame. Therefore, the scanning time for the touch control scanning is greatly reduced.

In addition, the control method provided by the present disclosure further includes the following step: increasing a scanning time interval for the touch control scanning in the touch idle mode, so that the frequency for the touch control scanning in the touch idle mode is smaller than that for the touch control scanning in a touch activation mode. In some embodiments of the present disclosure, the frequency for the touch control scanning in the touch idle mode is 1/N of the frequency for the touch control scanning in the touch activation mode, and the N is an integer greater than 1.

According to another aspect of the present disclosure, there is provided a touch display system, which is, for example, a TDDI system. The touch display system includes a touch display apparatus and a control apparatus, where the touch display apparatus has, for example, a structure shown in FIG. 2 and FIG. 3, and includes multiple touch sensing channels, where the control apparatus is configured to operate in the above-mentioned control method.

The control apparatus includes: a display control module, for example, including the gate driving module 111 and the source driving module 112 in FIG. 2, and configured to perform display scanning on the touch display apparatus in a display time period to display a picture; and a touch control module, for example, including the touch apparatus 120 in FIG. 3, and configured to perform touch control scanning on the touch display apparatus in a touch control time period to obtain a touch sensing signal, obtain touch sensing data according to the touch sensing signal and detect touch according to the touch sensing data.

The control apparatus further includes a switch module being coupled between the touch control module and the multiple touch sensing channels, and configured to short-circuit the multiple touch sensing channels under the control of the touch control module and then couple the multiple touch sensing channels to the touch control module or independently couple the multiple touch sensing channels to the touch control module.

In summary, according to the control method and the touch display system provided by the present disclosure, by short-circuiting multiple touch sensing channels in the touch idle mode and scanning one of the multiple touch sensing channels in a touch control time period of one of multiple sub-frames, the scanning time is greatly reduced and the power consumption of the touch display apparatus in the touch idle mode may be reduced. In a preferred embodiment, the frequency for touch control scanning of the touch display apparatus in the touch idle mode is smaller than that for the touch control scanning of the touch display apparatus in the touch activation mode, so that the power consumption may further be reduced. In other embodiments of the present disclosure, the first-frame touch sensing data after the touch idle mode is used as reference data, and the difference between the touch sensing data of each frame and the reference data is calculated, and when the difference is greater than a preset value, it is determined that touch occurs and the touch activation mode may be quickly switched back to, and therefore, the user experience is not affected.

It is to be explained that the relationship terms, such as "first" and "second", are used herein only for distinguishing one entity or operation from another entity or operation but do not necessarily require or imply that there exists any actual relationship or sequence of this sort between these entities or operations. Furthermore, terms "comprising", "including" or any other variants are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

The embodiments in accordance with the present disclosure, as described above, are not described in detail, and are not intended to limit the present disclosure to be only the described particular embodiments. Obviously, many modifications and variations are possible in light of the above. These embodiments have been chosen and described in detail by the specification to explain the principles and embodiments of the present disclosure so that those skilled in the art can make good use of the present disclosure and the modified use based on the present disclosure. The disclosure is to be limited only by the scope of the appended claims and the appended claims and equivalents thereof.

The invention claimed is:

1. A control method for a touch display apparatus, the touch display apparatus comprising multiple touch sensing channels, and the control method comprising: dividing one frame into multiple sub-frames, wherein each sub-frame comprises a display time period and a touch control time period; performing display scanning on the touch display apparatus in the display time period to display a picture; performing touch control scanning on the touch display apparatus in the touch control time period to obtain a touch sensing signal; and obtaining touch sensing data according to the touch sensing signal and detecting touch according to the touch sensing data,
   wherein performing touch control scanning on the touch display apparatus comprises:
   if no touch is detected in a preset time period, entering a first mode in which the multiple touch sensing channels are short-circuited and one of the multiple touch sensing channels is scanned in the touch control time period of one of the multiple sub-frames; and
   if touch is detected in the preset time period, entering a second mode in which the multiple touch sensing channels are respectively scanned in the touch control time periods of the multiple sub-frames,
   wherein the frequency for the touch control scanning in the first mode is smaller than that for the touch control scanning in the second mode.

2. The control method according to claim 1, further comprising:
   if touch is detected in the first mode, switching to the second mode.

3. The control method according to claim 2, wherein that one of the multiple touch sensing channels is scanned in the touch control time period of one of the multiple sub-frames comprises:
   scanning one of the multiple touch sensing channels in the touch control time period of a second sub-frame of the frame.

4. The control method according to claim 1, wherein detecting touch according to the touch sensing data comprises:
   calculating a difference between the touch sensing data and reference data; and
   comparing the difference with a preset value, and when the difference is greater than the preset value, determining that the touch occurs,
   wherein the reference data used in the first mode is a first-frame touch sensing data obtained after the first mode is entered.

5. The control method according to claim 1, wherein the frequency for the touch control scanning in the first mode is 1/N of the frequency for the touch control scanning in the second mode, and N is an integer greater than 1.

6. A touch display system, comprising a touch display apparatus and a control apparatus, wherein the touch display apparatus comprises multiple touch sensing channels, and the control apparatus is configured to perform the method according to claim 1.

7. The touch display system according to claim 6, wherein the control apparatus comprises:
   a display control module, configured to perform display scanning on the touch display apparatus in a display time period to display a picture; and
   a touch control module, configured to perform touch control scanning on the touch display apparatus in a touch control time period to obtain a touch sensing signal, obtain touch sensing data according to the touch sensing signal and detect touch according to the touch sensing data.

8. The touch display system according to claim 7, wherein the control apparatus further comprises a switch module being coupled between the touch control module and the multiple touch sensing channels and configured to short-circuit the multiple touch sensing channels and then couple the multiple touch sensing channels to the touch control module, or independently couple the multiple touch sensing channels to the touch control module, under the control of the touch control module.

9. The touch display system according to claim 7, comprising a Touch and Display Driver Integration (TDDI) system.

10. A control method for a touch display apparatus, the touch display apparatus comprising multiple touch sensing channels, and the control method comprising: dividing one frame into multiple sub-frames, wherein each sub-frame comprises a display time period and a touch control time period; performing display scanning on the touch display apparatus in the display time period to display a picture; performing touch control scanning on the touch display apparatus in the touch control time period to obtain a touch sensing signal; and obtaining touch sensing data according to the touch sensing signal and detecting touch according to the touch sensing data,
wherein performing touch control scanning on the touch display apparatus comprises:
if no touch is detected in a preset time period, entering a first mode in which the multiple touch sensing channels are short-circuited and one of the multiple touch sensing channels is scanned in the touch control time period of one of the multiple sub-frames; and
if touch is detected in the preset time period, entering a second mode in which the multiple touch sensing channels are respectively scanned in the touch control time periods of the multiple sub-frames,
wherein detecting touch according to the touch sensing data comprises:
calculating a difference between the touch sensing data and reference data; and
comparing the difference with a preset value, and when the difference is greater than the preset value, determining that the touch occurs,
wherein the reference data used in the first mode is a first-frame touch sensing data obtained after the first mode is entered.

11. The control method according to claim 10, wherein that one of the multiple touch sensing channels is scanned in the touch control time period of one of the multiple sub-frames comprises:
scanning one of the multiple touch sensing channels in the touch control time period of a second sub-frame of the frame.

* * * * *